June 21, 1966 R. R. LASKEY ET AL 3,257,069
TURBOCHARGERS
Original Filed April 5, 1963 3 Sheets-Sheet 3

INVENTORS
Richard R. Laskey
Brian M. Gallagher

United States Patent Office 3,257,069
Patented June 21, 1966

1

3,257,069
TURBOCHARGERS
Richard R. Laskey and Brian M. Gallagher, San Diego, Calif., assignors, by mesne assignments, to International Harvester Company, Chicago, Ill., a corporation of New Jersey
Original application Apr. 5, 1963, Ser. No. 270,967. Divided and this application Mar. 10, 1965, Ser. No. 444,495
3 Claims. (Cl. 230—14)

This application is a division of co-pending application, Serial No. 270,967, filed April 5, 1963, for turbochargers.

This invention relates to superchargers and more particularly to superchargers of the type commonly called turbochargers. By definition, superchargers are mechanically driven through belts or gears linking them to an engine crankshaft, while turbochargers or turbo-superchargers comprise a free turbo compressor run by the engine exhaust.

More specifically, this invention relates to an integral turbocharger including the turbocharger per se, necessary controls, and a heat exchanger or intercooler providing a compact package in place of previous systems in which each of the elements was an individual unit requiring considerable space and excessive installation cost.

It is accordingly a primary purpose and object of the present invention to provide improved integral turbocharger assemblies which are of reduced size, weight, and cost compared to prior units of comparable performance and which are accordingly particularly adapted for use with engines of the automotive class.

It is a further object of the present invention to provide improved turbochargers which are of relatively simple rugged mechanical construction and which thus may be manufactured and sold at reasonable cost with a relatively low overall installation cost, and yet which provide improved reliability and offer an extended trouble-free service life.

It is an additional object of the present invention to provide improved turbochargers which may be readily adapted for use with internal combustion engines having widely varying configurations.

As is well known in the art, many of the advantages of turbocharging are not fully realized because of the increase in temperature of the compressed air delivered to the engine. Accordingly, it has been proposed to reduce the temperature of the air by passing it through a heat exchanger, commonly called an intercooler, interposed between the compressor outlet and the engine intake manifold. In all prior installations the intercoolers have been entirely separate from the turbochargers and have been of considerable bulk. However, the use of separate intercoolers is not acceptable for automotive use and accordingly, despite the advantages of intercooling, it has not heretofore been practical for small engines.

It is accordingly a further major object of the present invention to provide improved turbochargers including a novel integral intercooler which is wrapped around a portion of the turbocharger and disposed within the envelope defined by the turbine and compressor units thereby maintaining the diameter of the turbocharger, which is usually a critical dimension, within acceptable limits for automotive use.

It is a further object of the present invention to provide an improved turbocharger incorporating in a novel manner an intercooler which forms a part of the shell or supporting structure for the turbocharger thus providing a strong, compact, lightweight unit.

In accordance with the present invention the intercooler is of a spiral configuration and incorporates passages for the compressed air in heat exchange relation with coolant from the normal engine cooling system to provide a high efficiency heat exchange apparatus which operates with minimum air pressure drop consistent with high effectiveness.

It is a further object of the present invention to provide an improved intercooler for turbochargers which permits an unusual degree of flexibility and range of performance characteristics and which may be fabricated at low cost in a variety of sizes.

Ideally, a turbocharger should require maintenance and overhaul no more frequently than the engine with which it is associated. This objective has not been achieved in prior constructions largely because of the problem of bearing lubrication which is of critical importance because of the high speeds attained by the turbine-compressor unit and the absence of adequate lubrication when the engine is initially started and finally stopped. In a practical system the turbocharger must depend upon the primary engine oil supplied for lubrication. While such a system functions well when the engine and the turbocharger have been in operation for some time it has been discovered that when the primary engine is started, up to several minutes may elapse before the engine oil pump delivers sufficient oil to the turbocharger to accomplish even minimal lubrication. In the past, efforts have been made to solve this problem, for example, by bypassing the turbocharger turbine during starting, providing a separate oil accumulator for the turbocharger, or by providing a manual brake for the turbocharger rotor. However, none of these expedients has been successful.

It is a further major object of the present invention to solve this problem by the provision of a turbocharger incorporating a novel automatic brake assembly which prevents rotation of the turbine and compressor units except when lubricating oil at adequate pressure is available at the rotor bearings.

Since the brake is entirely automatic and does not depend on operator control and is not affected by variables such as ambient temperature and oil viscosity, it provides complete protection for the rotor bearings under all conditions and thus greatly extends the life of the turbocharger unit.

Additional objects and advantages of the present invention will become apparent as the description proceeds in connection with the accompanying drawings in which:

FIGURE 5 is an enlarged vertical central section of the rotor brake assembly.

Figure 1:
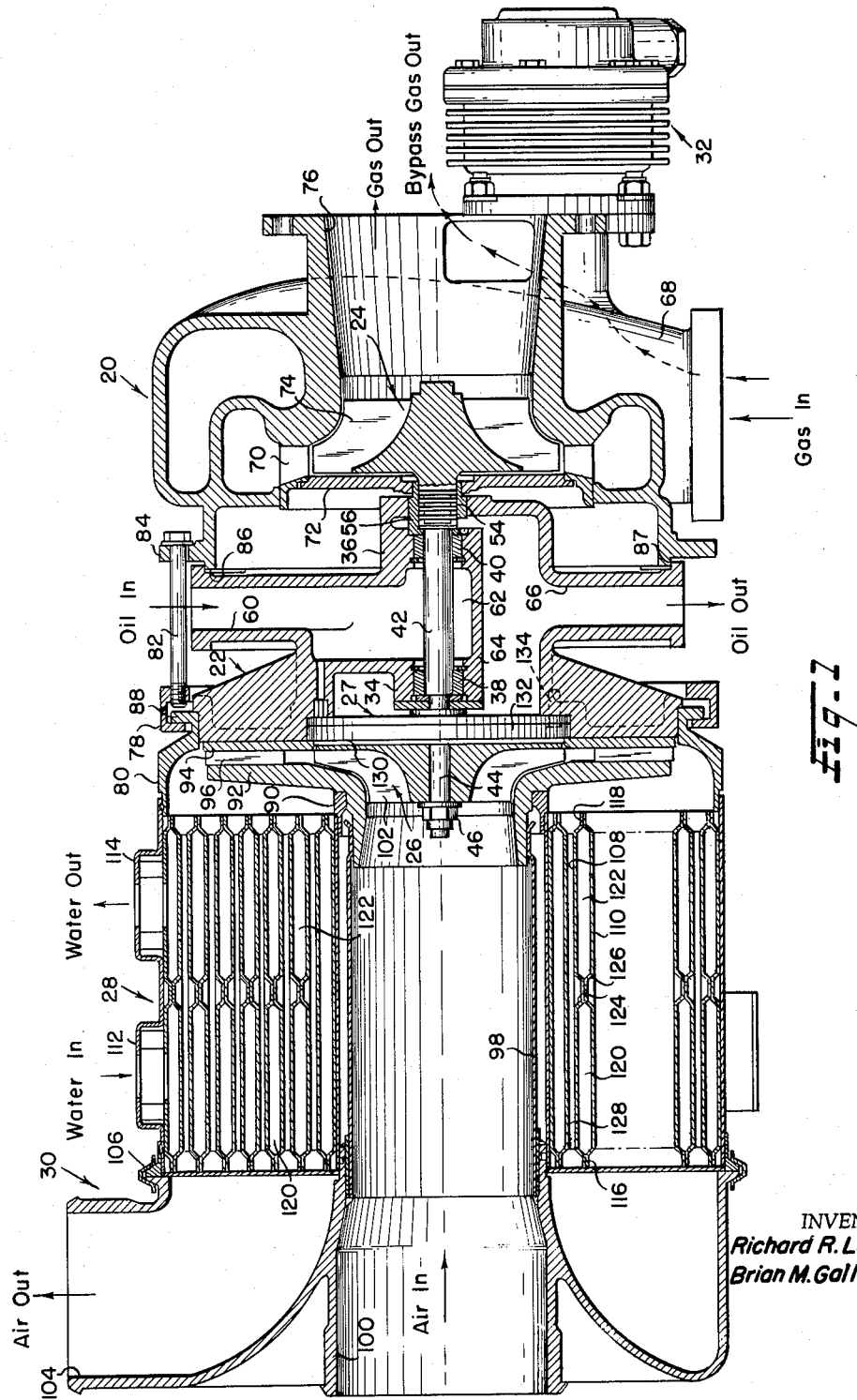
FIGURE 1 is a longitudinal central section taken through a turbocharger unit constructed in accordance with the present invention.

With continued reference to the drawings and particularly FIGURES 1 and 2, the principal components of the turbocharger of the present invention to be described in detail below are the turbine scroll indicated generally at 20, the main housing and bearing support assembly indicated at generally 22, the turbine rotor 24, the compressor rotor 26, the automatic rotor brake assembly 27 and the air inlet and outlet scroll assembly 30 which incorporates the intercooler assembly 28.

Figure 2:
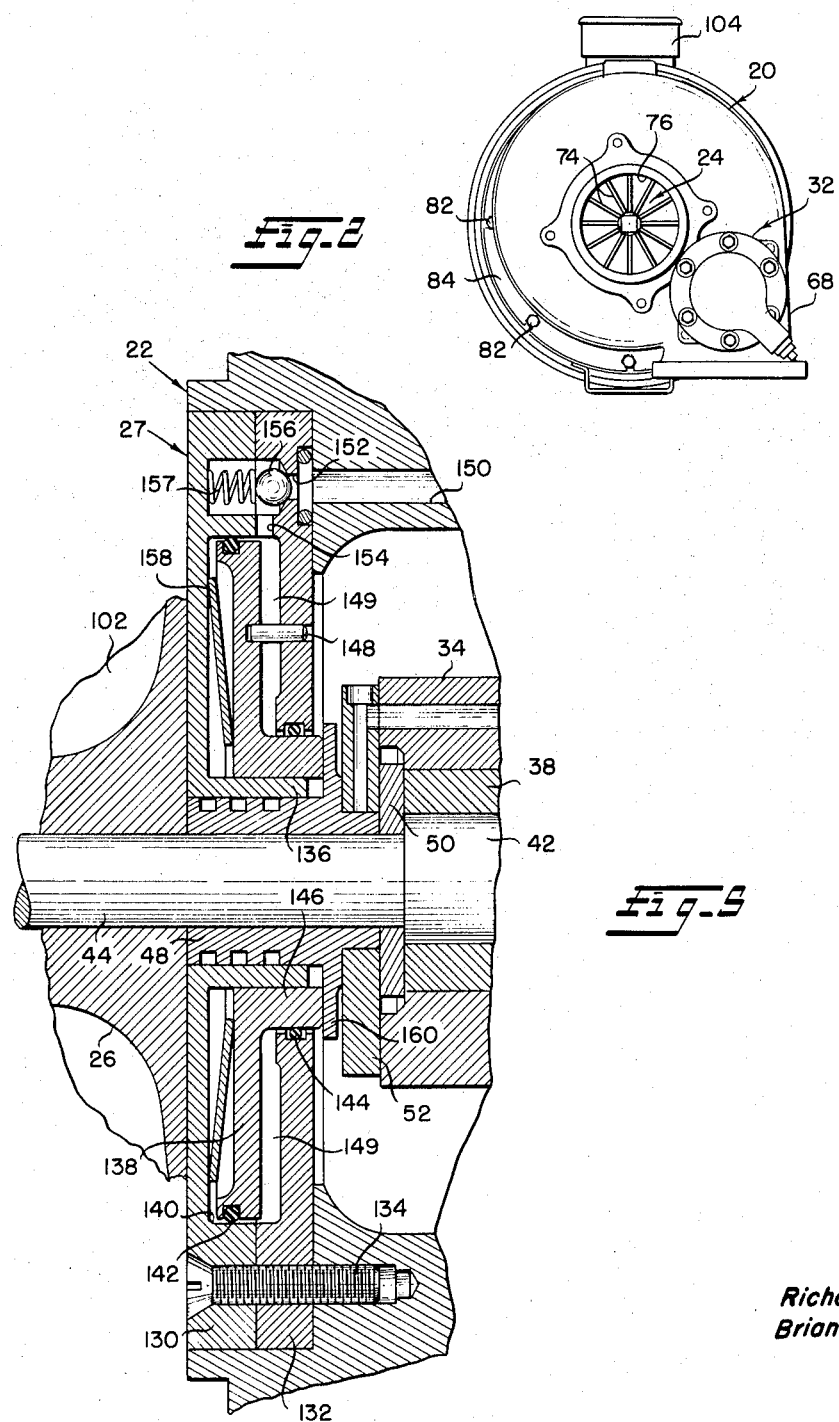
FIGURE 2 is an end elevation of the unit of FIGURE 1.
Figure 3:
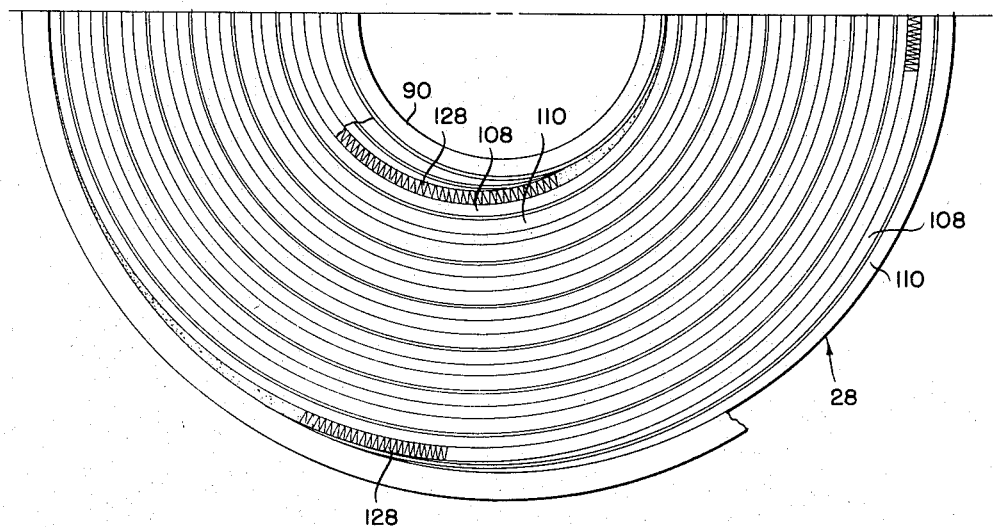
FIGURE 3 is an enlarged fragmentary elevation of the intercooler incorporated in the units of FIGURES 1 and 2.
Figure 4:
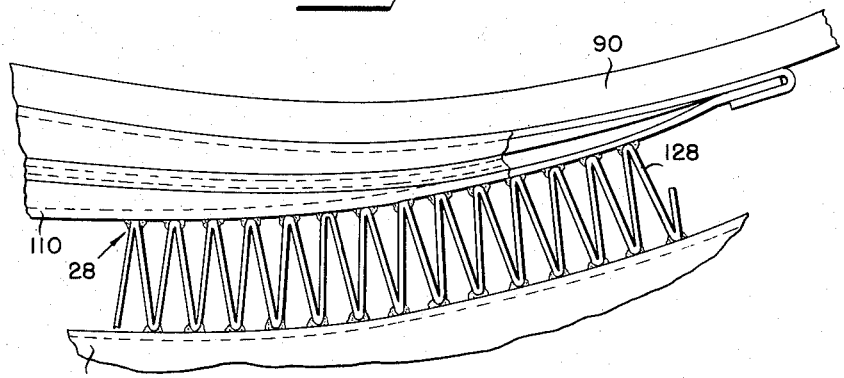
FIGURE 4 is an enlarged view of a portion of the intercooler shown in FIGURE 3.

Also shown in elevation in FIGURES 1 and 2, is a novel control unit indicated generally at 32, for regulating the output of the turbo compressor unit. This unit forms no part of the present invention and is disclosed and claimed in application Serial No. 270,967, filed on April 5, 1963, for Turbocharger Controls.

The central housing and bearing support assembly 22, to which the other members are secured, is of generally annular configuration and includes aligned spaced bosses 34 and 36 in which the main rotor bearings 38 and 40 are positioned. The cylindrical central portion of the rotor shaft 42 extends through bearings 38 and 40 and carries at one end the turbine rotor 24, which is preferably formed integrally with the rotor shaft 42. The reduced opposite end portion 44 of the rotor shaft 42 extends through the rotor brake assembly 27 and carries the compressor rotor 26 which is held in place by a lock nut and washer assembly 46, the innerface of the rotor assembly being pressed against a seal and slinger member 48 provided with a conventional seal in engagement with the inner periphery of the brake assembly 27. The inner end of the seal member 48 abuts a spacer 50 which in turn engages the adjacent end of bearing 38 and the enlarged central portion of the rotor shaft 42. A thrust bearing 52 is suitably secured to to the end of boss 34 and extends between portions of the seal member 48 and the spacer 50.

The turbine end of the rotor shaft is provided with a conventional seal 54 which cooperates with a stationary seal member 56 non-rotatably carried by an extension of boss 36.

Lubricating oil is supplied from the regular engine lubrication system through a conduit, not shown, which leads to inlet opening 60 in the housing member 22, the oil passing to central cavity which includes a reservoir 62 formed between the two bearings 38 and 40 by a web 64 joining the lower portions of bosses 34 and 36. The oil is returned to the main engine lubricating system through an outlet conduit 66.

The turbine rotor is surrounded by the scroll assembly 20 which is of essentially conventional configuration having a tangential inlet section 68 leading to an inlet nozzle formed by a bladed nozzle ring 70 carried by a radial plate 72 mounted on an extension of the outer seal member 56. In accordance with conventional practice the blades 70 are inclined to increase the spin of the incoming gas which passes inwardly through the blades 74 of the rotor 24 and exits from the scroll 20 through an axial opening 76.

The turbine scroll 20, as well as the outlet scroll and intercooler assembly, are clamped to the main housing section 22 by a single clamp mechanism thus dispensing with the costly and complex connections usually provided. The clamping mechanism includes a flanged split ring 78 which engages a mating flange of an annular casting 80 welded to the inner end of the intercooler assembly 28. A series of studs 82 extend through a radial flange 84 provided in the turbine scroll 20 and are adjustably threaded into the split rings 78 to clamp the assemblies securely together.

To assure accurate alignment of the turbine scroll, it is provided with an annular pilot ring 86 which is received within a mating machined recess 87 in the housing member 22. The intercooler-compressor assembly is similarly aligned by carefully machined annular pilot surfaces on the flange 88 of fitting 80 and the main housing 22.

When the studs 82 are drawn tight they also position and clamp all of the internal parts, the proper axial spacing being maintained by the use of shims where necessary. This construction provides a uniquely simple means for holding the major components together and providing the proper internal spacing and also facilitates rapid disassembly of the unit for inspection or repair.

When the intercooler assembly 28 is clamped in place an annular fitting 90, provided on its inner periphery is urged against an annular air inlet fitting 92 containing diffuser vanes 96, to hold it in turn against a radial surface of main housing 22.

The incoming air passes through the central inlet of fitting 92 and through a sleeve 98 carried by the compressor scroll assembly 30, the sleeve being in communication with an axial opening 100 in the casting 30.

As will be apparent, air is drawn in from the atmosphere through opening 100 and the sleeve 98 and is compressed by blades 102 of the compressor assembly 26, passes outwardly through diffuser blades 96, thence through the intercooler assembly 28 for the delivery to the engine through an outlet opening 104 in the casting 30.

The split ring clamp 106, which holds the casting 30 to the intercooler assembly 28, provides a simple economical means of attaching these parts and permits their ready disassembly.

The intercooler, to which detailed reference will now be made, is of the two pass water and one pass air type. The main body of the intercooler assembly is formed from a single tube formed by inner and outer sheets 108 and 110.

The intercooler may readily be formed by the following steps: (1) providing a flat metal strip 110 of suitable size with cutouts which in final assembly will be the water inlet and outlet connectors 112 and 114, respectively; (2) juxtaposing this sheet with a second sheet 108 of similar size in parallel face-to-face relation; (3) welding or otherwise joining the sheets around the perimeter, as shown generally at 116 and 118; (4) welding or otherwise joining the center line of the sheets along substantially their entire length, however, leaving sufficient unjoined area at the end remote from the cutouts to provide a cross-over area; (5) rolling the thus joined sheets into a loose coil with the cutouts on the outside of the roll; (6) applying water pressure through the cutouts to the interior of the joined sheets to bulge the unattached areas and thus achieve the desired water passages 120 and 122 separated by central ridges 124 and 126. Following the above operations, a fin assembly 128 is welded or otherwise attached in place between adjacent layers of the tubing. Fins 128 perform the dual function of imparting the necessary structural rigidity to the intercooler assembly and substantially enhancing the heat exchange efficiency of the unit.

When the unit is in operation, water from any suitable source, such as the conventional engine cooling system, is supplied to an inlet fitting 112 and spirals inwardly to the center of the intercooler through the first pass 120. Since the ridges 124 and 126 are omitted from the innermost section of the intercooler, the water, when reaching this area, enters the second pass 122 and spirals outwardly through the intercooler, returning to the engine cooling system through an outlet fitting 114.

The unique configuration of the intercooler and its unique association with the remaining components of the turbocharger in such a manner that it does not increase the overall radial dimensions of the turbocharger. The construction of the intercooler provides an unusual degree of flexibility for installation and range of performance characteristics. For example, the overall diameter of the intercooler can be increased or decreased without any material change in the fabrication technique or tooling required. In contrast, conventional heat exchangers generally require new castings, header plates, gaskets, and tooling as well as changes in tube and fin section for the smallest change in volume of the core. In the subject intercooler the size can be increased by simply providing an increased length of raw sheet stock for the tube, fin, outer shell and flanges.

The novel rotor brake of the present invention will now be described with particular reference to FIGURE 5. This brake assembly includes front and rear plates 130 and 132 secured by a series of screws 134 in an annular recess formed in the main housing and bearing support assembly 22.

The outer housing member 130 is provided with an axial flange 136 which surrounds the seal and slinger member 48 which is securely attached to the reduced portion of the rotor shaft. An annular piston and brake member 138 is received for axial sliding movement on the outer periphery of the flange 136 and the inner periphery of an outer flange 140. The outer periphery of the brake member carries an O-ring 142 in engagement with the flange 140 and the inner periphery of the plate 132 carries an O-ring 144 in engagement with an axial projection 146 of the brake member. These O-rings hold the brake member 138 securely against torque reaction rotation. If desired this action of the O-rings may be supplemented by a pin 148.

The area between the brake member 138 and the cover plate 132 forms a sealed pressure chamber 149 which is in communication with the main oil system through a drilled passage 150 and ports 152 and 154 in the plate 132. A ball check valve 156 seated by a spring 157 is provided between the ports 152 and 154 to permit substantially unimpeded entry of the lubricating oil into the pressure chamber 149 and to provide restricted flow out of the pressure chamber. In the absence of pressure in chamber 149 a Bellville spring 158 urges the brake member 138 to the right to dispose the end of flange 146 in firm engagement with the outer periphery of slinger 160. The engagement pressure in this area is sufficient to lock the turbine rotor against rotation to a predetermined torque value.

When the primary engine is started the exhaust gases acting on the turbine blades would begin to rotate the turbine-compressor assembly immediately except for the action of the brake. As the primary engine enters its warm-up or idle cycle the oil pump begins to deliver oil to the passage 60. A portion of this oil passes through the duct 150 and into the pressure chamber 149. The brake however, continues to be effective until the pressure rises sufficiently to unseat the ball check valve 156 and permit sufficient pressure to develop in the chamber 149 to move the brake element 138 to the left against the resistance of the spring 158. The springs 157 and 158 are so calibrated that the oil pressure necessary to overcome their resistance is also sufficient to insure adequate lubrication for the turbo-charger bearings.

As soon as the brake 132 is released the turbine begins its normal operation which continues until the primary engine is stopped. When this occurs the rate of rotation of the turbo-charger rotor will decay gradually. During this period the bearings are adequately lubricated despite the fact that substantially all of the oil in the turbo-charger cavity immediately flows to the sump of the primary engine. Thus, there is no need to produce a rapid stop of the turbine rotor and further if the brake were immediately applied it would produce a substantial amount of unnecessary wear on the braking surfaces. Accordingly, the ball check 156 is provided to maintain the brake release pressure in the chamber 149 long enough to permit the rotor to stop or reach a very low speed before the pressure in chamber 149 has been reduced sufficiently to apply the brake 132. Accordingly, the brake is never effective to stop the rotor but is effective to keep the rotor from rotating until its bearings are adequately lubricated. Accordingly, the brake may be of relatively small dimensions and wear encountered in use is negligible.

From the foregoing it will be apparent that the above-stated objects of the present invention have been obtained by the provision of improved turbochargers which are of simplified compact construction, which provide improved performance, in part because of the incorporation of a novel intercooler, and which have increased life and reliability in part because of the operation of the novel brake which affords unusual protection for the rotor bearings.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A turbocharger comprising a main housing having spaced bearings, a rotor shaft rotatably mounted on said spaced bearings, the opposite ends of said shaft projecting beyond said bearings, a turbine rotor and a compressor rotor rigid with the respective projecting ends of said rotor shaft, means providing a central cavity in said main housing for the reception of lubricating oil under pressure for said bearings, a first brake member nonrotatably carried by said main housing for limited axial movement therein, a cooperating second brake member rigid with said rotor shaft, a spring normally biasing said brake members into engagement, and means responsive to the supply of lubricating oil at a predetermined pressure for moving said first brake member axially away from said second brake member to release said rotor for rotation.

2. A turbo charger comprising a main housing member, spaced aligned bearings in said main housing member, a rotor shaft rotatably supported in said bearings, the opposite ends of said rotor shaft projecting beyond the ends of said housing member, means providing a central cavity in said main housing member for the reception of lubricating oil under pressure for said bearings, a turbine rotor and a compressor rotor rigid with the respective ends of said rotor shaft, a turbine scroll assembly surrounding said turbine rotor, a compressor scroll assembly surrounding said compressor rotor, clamp means extending across said main housing member and engageable with said turbine scroll assembly and said compressor scroll assembly to hold said scroll assemblies in assembled relation with said main housing member, a first brake member nonrotatably carried by said housing member in surrounding relation with said rotor shaft adjacent one of said bearings, said first brake member being mounted for limited axial movement in said housing member, a cooperating second brake member rigid with said rotor shaft, a spring normally biasing said brake members into engagement, and means responsive to the supply of lubricating oil to said central cavity at a predetermined pressure moving said first brake member axially away from said second brake member to release said rotor shaft for rotation.

3. The turbo charger according to claim 2 wherein said second brake member comprises a seal member disposed between one of said bearings and said compressor rotor, said seal member having a radial flange for engagement with said first brake member.

References Cited by the Examiner

UNITED STATES PATENTS 1,844,954  2/1932  Good _____ 230—5
2,961,146  11/1960  Snow _____ 230—13 X ROBERT M. WALKER, *Primary Examiner.*